Patented Sept. 15, 1936

2,054,509

UNITED STATES PATENT OFFICE 2,054,509

METHOD FOR THE SELECTIVE DESTRUCTION OF WEEDS

Isaac Pastac, Versailles, France

No Drawing. Application May 29, 1933, Serial No. 673,560. In France June 4, 1932

5 Claims. (Cl. 167—45)

The present invention relates to the selective destruction of weeds, and to the improvement of crops.

The question of the destruction of weeds growing in fields among grain or other crops, offers a great technical and economic interest. The question is of a complex nature, for in fact it is desired to destroy the weeds such as the charlock without injuring the grain or other cultivated plants.

For this purpose, it has been recommended to employ the spraying of the crops with solutions of sulphuric acid. This method, although economical, is unsatisfactory in its use, as the sulphuric acid partially burns the leaves of the grain plants themselves. Its action thus delays the vegetation, and may reduce the yield.

On the other hand, the activity of the acid is stopped as soon as it makes contact with the ground, and thus it has no action upon the sprouts of the weeds which have not yet appeared at the surface of the ground, nor upon bacteria, protozoa, insects and worms which live in the ground.

It has been further recommended to employ the soluble salts of arsenic for the removal of weeds. However, the action of these products is not specific, and the accumulation of such poisonous substances in the ground may more or less rapidly bring about the complete sterility of the soil.

The chlorates have the advantage of being readily applied, but their action is not sufficiently selective.

We have found that the nitrated oxy-derivatives of the aromatic type, substituted or not, constitute excellent products for the destruction of weeds and hence for the improvement of crops. These products may be applied to the fields either before the sowing or during the vegetative period.

As examples of such products, the following may be mentioned: the 1 oxy-2 nitrobenzene, and its isomers, the 2,4 dinitro-1-oxybenzene and its isomers, the 4,6 dinitro 1,3 dioxybenzene, the various methyl-oxybenzenes, mono- and poly-nitrated, the 1 oxy-2 chloro-4 nitrobenzene, the 1 oxy-2,4 dinitro 6 chlorobenzene, the 1 oxy-2 nitroso-4 nitro-naphthalene, etc.

All of these products may be employed in powder or in solution, and in the form of the original substances or of their salts. They may be applied to the fields either alone or mixed with either inert, soluble substances such as sodium carbonate or the sulphates of the alkaline metals or inert insoluble substances such as the sulfates of the alkaline earth metals, talc, sand, fine earth, chalk or kieselguhr or with the addition of other active products, such as different fertilizers, or anti-cryptogamic or insecticide substances.

It is possible to add to the active substances, various products which reduce the surface tension of the water, in order to facilitate the penetration of the active products. For such purposes, use can be made of the sulphoricinates, the higher sulphonated alcohols, the salts of the substituted sulpho-naphthalenes, etc.

The beneficial action of these substances is not limited to the destruction of weeds, as the aromatic nitrated oxy-derivatives further the growth of the crops, in the first place by causing the weeds to disappear, and again, by destroying in the ground at the same time, the fauna and flora which are prejudicial to the crops, such as the bacteria, the protozoa, the parasitic mushrooms or spores and the insects. Among the enemies to crops which may be thus treated, are the amoebas, the nematoidea, the lower orders of mushrooms, such as the ophiobolus, the spores of different parasites, such as the phytophthora, the larvae of the cecidomyia, and certain perfect insects, such as the aphides, wooly apple aphyd, etc.

I claim:

1. A method for the destruction of weeds and for the improvement of crops which consists in spraying the cultivated ground and the crop with compounds of the type

where R is a benzene or naphthalene nucleus, $x=1$ or 2 hydroxy groups, $y=1$ or 2 nitro groups and Z=chlorine, nitroso, hydrogen or methyl.

2. A product for the destruction of weeds and for the improvement of crops which comprises compounds of the type

where R is a benzene or naphthalene nucleus, $x=1$ or 2 hydroxy groups, $y=1$ or 2 nitro groups and Z=chlorine, nitroso, hydrogen or methyl.

3. A method for the destruction of weeds and of the parasitic fauna and for the improvement of crops consisting in spraying the cultivated ground and the crop with compounds of the type

where R is a benzene or naphthalene nucleus, $x=1$ or 2 hydroxy groups, $y=1$ or 2 nitro groups and Z=chlorine, nitroso, hydrogen or methyl.

4. A product for the destruction of weeds and parasitic fauna and for the improvement of crops which comprises a solution of compounds of the type

where R is a benzene or naphthalene nucleus, $x=1$ or 2 hydroxy groups, $y=1$ or 2 nitro groups and Z= chlorine, nitroso, hydrogen or methyl and substances for reducing the surface tension of water selected from the group consisting of sulforicinoleates, higher sulfonated alcohols and salts of the substituted sulfo-naphthalenes.

5. The product for the destruction of weeds, comprising compounds of the type

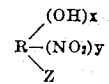

where R is a benzene or naphthalene nucleus, $x=1$ or 2 hydroxy groups, $y=1$ or 2 nitro groups and Z=chlorine, nitroso, hydrogen or methyl and substances adapted to carry these compounds, consisting of materials selected from the group consisting of sodium carbonate, the sulfates of the alkali and alkaline earth metals, talc, sand, fine earth, chalk and kieselguhr.

ISAAC PASTAC.